United States Patent
Fujioka et al.

(10) Patent No.: US 11,072,098 B2
(45) Date of Patent: Jul. 27, 2021

(54) METHOD FOR MANUFACTURING COMPOSITE STRUCTURE AND METHOD FOR MANUFACTURING INTEGRATED COMPOSITE STRUCTURE

(71) Applicant: TORAY INDUSTRIES, INC., Tokyo (JP)

(72) Inventors: Takashi Fujioka, Ehime (JP); Yoshiki Takebe, Ehime (JP); Masato Honma, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 38 days.

(21) Appl. No.: 16/471,228

(22) PCT Filed: Dec. 20, 2017

(86) PCT No.: PCT/JP2017/045806
§ 371 (c)(1),
(2) Date: Jun. 19, 2019

(87) PCT Pub. No.: WO2018/117187
PCT Pub. Date: Jun. 28, 2018

(65) Prior Publication Data
US 2020/0086532 A1    Mar. 19, 2020

(30) Foreign Application Priority Data

Dec. 22, 2016 (JP) .............................. JP2016-248749

(51) Int. Cl.
   *B29C 39/10*      (2006.01)
   *B29C 39/24*      (2006.01)
   (Continued)

(52) U.S. Cl.
   CPC .............. *B29C 39/10* (2013.01); *B29C 39/24* (2013.01); *B29C 43/006* (2013.01); *B29C 44/04* (2013.01);
   (Continued)

(58) Field of Classification Search
   None
   See application file for complete search history.

(56) References Cited

U.S. PATENT DOCUMENTS 4,025,686 A * 5/1977 Zion ..................... B29C 70/025
                                                          442/373
4,330,494 A * 5/1982 Iwata .................... B29C 44/186
                                                          264/46.2

(Continued)

FOREIGN PATENT DOCUMENTS

CN    101233167 A    7/2008
CN    101296791 A    10/2008
(Continued)

OTHER PUBLICATIONS

Extended European Search Report for European Application No. 17885116.8, dated Jun. 24, 2020.
(Continued)

*Primary Examiner* — Edmund H Lee
(74) *Attorney, Agent, or Firm* — Birch, Stewart, Kolasch & Birch, LLP (57) ABSTRACT

A method for manufacturing a composite structure in which a first member and a structure material as a second member are integrated, the method including: an arrangement step of arranging a structure precursor including a resin and reinforced fibers in a mold made of the first member; a heating step of heating the structure precursor to equal to or higher than a temperature at which a storage elastic modulus (G') of the structure precursor is less than $1.2 \times 10^8$ Pa; a shaping step (Continued)

of expanding the structure precursor by heating to form a structure material as a second member, and bringing the structure material into close contact with the first member to obtain a composite structure; and a cooling step of cooling the composite structure.

12 Claims, 3 Drawing Sheets

(51) Int. Cl.
<table>
<tr><td>B29C 43/00</td><td>(2006.01)</td></tr>
<tr><td>B29C 70/68</td><td>(2006.01)</td></tr>
<tr><td>B29C 44/12</td><td>(2006.01)</td></tr>
<tr><td>B29C 44/04</td><td>(2006.01)</td></tr>
<tr><td>B29C 44/14</td><td>(2006.01)</td></tr>
</table>

(52) U.S. Cl.
CPC .............. *B29C 44/12* (2013.01); *B29C 44/14* (2013.01); *B29C 70/68* (2013.01)

(56) References Cited

U.S. PATENT DOCUMENTS

<table>
<tr><td>5,242,637 A *</td><td>9/1993</td><td>Inoue ................... B29C 44/16<br>264/126</td></tr>
<tr><td>5,866,052 A</td><td>2/1999</td><td>Muramatsu</td></tr>
<tr><td>2007/0034432 A1</td><td>2/2007</td><td>Rosenberg et al.</td></tr>
<tr><td>2007/0090560 A1</td><td>4/2007</td><td>Kassa et al.</td></tr>
<tr><td>2007/0125780 A1*</td><td>6/2007</td><td>Shiina ................... B29C 44/04<br>220/23.87</td></tr>
<tr><td>2013/0242487 A1</td><td>9/2013</td><td>Fujioka et al.</td></tr>
<tr><td>2016/0303824 A1</td><td>10/2016</td><td>Takebe et al.</td></tr>
</table>

FOREIGN PATENT DOCUMENTS

<table>
<tr><td>CN</td><td>103237646 A</td><td>8/2013</td></tr>
<tr><td>CN</td><td>105073403 A</td><td>11/2015</td></tr>
<tr><td>DE</td><td>102007059183 A1</td><td>6/2009</td></tr>
<tr><td>EP</td><td>3 279 249 A1</td><td>8/2013</td></tr>
<tr><td>EP</td><td>3078485 A1</td><td>10/2016</td></tr>
<tr><td>JP</td><td>7-124981 A</td><td>5/1995</td></tr>
<tr><td>JP</td><td>9-220785 A</td><td>8/1997</td></tr>
<tr><td>JP</td><td>2000-238141 A</td><td>9/2000</td></tr>
<tr><td>JP</td><td>2006-76060 A</td><td>3/2006</td></tr>
<tr><td>JP</td><td>2012-96519 A</td><td>5/2012</td></tr>
<tr><td>JP</td><td>2016-187935 A</td><td>11/2016</td></tr>
<tr><td>JP</td><td>2018-8440 A</td><td>1/2018</td></tr>
<tr><td>KR</td><td>10-2016-0077160 A</td><td>7/2016</td></tr>
<tr><td>TW</td><td>201636194 A1</td><td>10/2016</td></tr>
<tr><td>WO</td><td>WO 2017/110533 A1</td><td>6/2017</td></tr>
</table>

OTHER PUBLICATIONS

International Search Report, issued in PCT/JP2017/045806, PCT/ISA/210, dated Mar. 27, 2018.
Written Opinion of the International Searching Authority, issued in PCT/JP2017/045806, PCT/ISA/237, dated Mar. 27, 2018.
Chinese Office Action and Search Report for Chinese Application No. 201780077586.3, dated Oct. 10, 2020, with English translation of the Office Action.
Zhenwu, Ed., "Practical New Hardware Manual," Shenyang; Liaoning Science and Technology Press, 2015, pp. 42-43 with English translation (7 pages total).
Korean Grant of Patent for Korean Application No. 10-2019-7016793, dated Jan. 14, 2021, with an English translation.
Taiwanese Office Action and Search Report for Taiwanese Application No. 106145217, dated Mar. 5, 2021.

\* cited by examiner

METHOD FOR MANUFACTURING COMPOSITE STRUCTURE AND METHOD FOR MANUFACTURING INTEGRATED COMPOSITE STRUCTURE

TECHNICAL FIELD

The present invention relates to a method for manufacturing a composite structure in which a first member and a second member are integrated, and a method for manufacturing an integrated composite structure.

BACKGROUND ART

In recent years, market demands for improvement in stiffness and lightness are increasing year by year for industrial products such as automobiles, aircraft, and sporting products. To meet these demands, fiber-reinforced plastics excellent in stiffness and lightness are widely used for various kinds of industrial applications. In addition, multi-materialization combining various materials and feeling improvement are started to be studied. Above all, in order to satisfy lightness, a molded article having voids and a manufacturing method thereof have been studied. For example, in order to include voids in a core material part of a molded article, a method using a foamable material and a method using a large-scale apparatus such as an injection molding machine have been studied (see Patent Documents 1 and 2). Further, as a method of making a molded article into a hollow shape, an internal pressure molding and an external pressure molding are known (see Patent Document 3).

PRIOR ART DOCUMENTS

Patent Documents

Patent Document 1: Japanese Patent Application Laid-open No. 07-124981
Patent Document 2: Japanese Patent Application Laid-open No. 2016-187935
Patent Document 3: Japanese Patent Application Laid-open No. 2000-238141

SUMMARY OF THE INVENTION

Problems to be Solved by the Invention

However, in view of enhancing mechanical properties, it is preferable that a molded article does not contain a foamable material, and it is not preferable to use a large-scale apparatus or mold because cost increases. On the other hand, in the internal pressure molding and the external pressure molding, it is necessary to spend time in preforming and many auxiliary materials are also required, which is not preferable in view of productivity.

The present invention has been made in view of the above problems, and an object thereof is to provide a method for manufacturing a composite structure which can easily form a complicated shape and can manufacture a composite structure excellent in lightness and mechanical properties. Also, another object of the present invention is to provide a method for manufacturing a composite structure and a method for manufacturing an integrated composite structure which can manufacture a composite structure without requiring much cost.

Solutions to the Problems

The present invention is (1) as below.
(1) A method for manufacturing a composite structure in which a first member and a structure material as a second member are integrated, the method including:
an arrangement step of arranging a structure precursor including a resin and reinforced fibers in a mold made of the first member;
a heating step of heating the structure precursor to equal to or higher than a temperature at which a storage elastic modulus (G') of the structure precursor is less than $1.2 \times 10^6$ Pa;
a shaping step of expanding the structure precursor by heating to form a structure material as a second member, and bringing the structure material into close contact with the first member to obtain a composite structure; and
a cooling step of cooling the composite structure;
the first member having a bending modulus of 5 GPa or more at a temperature of the heating step,
the structure material as the second member including a resin, reinforced fibers and voids.

Effects of the Invention

According to the present invention, it is possible to provide a method for manufacturing a composite structure which can easily form a complicated shape and can manufacture a composite structure excellent in lightness and mechanical properties. Further, according to the present invention, it is possible to provide a method for manufacturing a composite structure and a method for manufacturing an integrated composite structure which can manufacture a composite structure without requiring much cost.

EMBODIMENTS OF THE INVENTION

Hereinafter, the method for manufacturing a composite structure according to the present invention will be described.

A method for manufacturing a composite structure according to the present invention is a method for manufacturing a composite structure in which a first member and a structure material as a second member are integrated, the method including:
an arrangement step of arranging a structure precursor including a resin and reinforced fibers in a mold made of the first member;
a heating step of heating the structure precursor to equal to or higher than a temperature at which a storage elastic modulus (G') of the structure precursor is less than $1.2 \times 10^8$ Pa;

a shaping step of expanding the structure precursor by heating to form a structure material as a second member, and bringing the structure material as a second member into close contact with the first member to obtain a composite structure; and a cooling step of cooling the composite structure, the first member having a bending modulus of 5 GPa or more at a temperature of the heating step, the structure material as the second member including a resin, reinforced fibers and voids.

Figure 1:
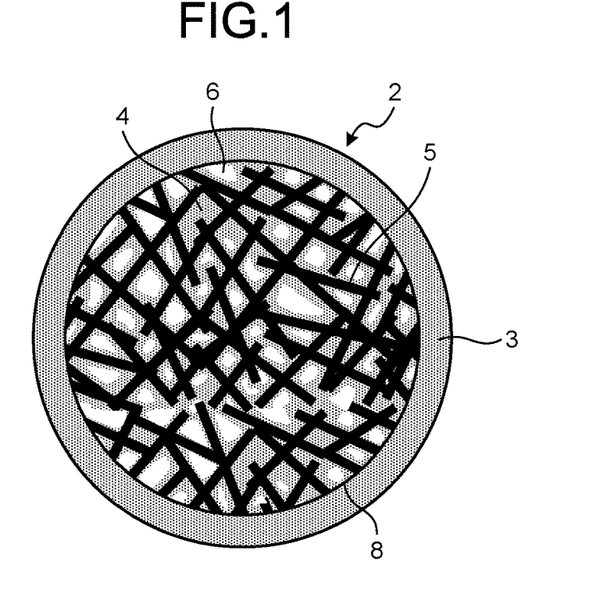
FIG. 1 shows a schematic diagram of a composite structure obtained by the manufacturing method according to the present invention.

A composite structure 2 obtained by the manufacturing method according to the present invention will be briefly described. FIG. 1 is a schematic diagram (section) of the composite structure 2 obtained by the manufacturing method according to the present invention. The composite structure 2 includes a pipe 3 as a first member and a core 8 as a second member. The core 8 is a structure material including a resin 4, reinforced fibers 5 and voids 6, and the core 8 is in close contact within and integrated with the pipe 3. In the manufacturing method according to the present invention, the pipe 3 as the first member functions as a mold, and a composite structure can be manufactured by arranging a structure precursor including the resin 4 and the reinforced fibers 5 in the pipe 3, heating the structure precursor to equal to or higher than a temperature at which a storage elastic modulus of the structure precursor is less than $1.2 \times 10^8$ Pa, expanding the structure precursor, and bringing the structure precursor into close contact with the pipe 3, followed by cooling.

In the manufacturing method of the present invention, in the arrangement step, by arranging a structure precursor including a resin and reinforced fibers in a mold made of the first member, the first member is finally a part of the composite structure. As a result, the composite structure can be manufactured without using a large apparatus such as a press molding machine or a mold attached to the large-apparatus. That is, the first member itself forming the composite structure is used as a mold for molding the structure material as the second member.

In the manufacturing method of the present invention, in the heating step, it is necessary to raise a temperature of the structure precursor to equal to or higher than a temperature at which the storage elastic modulus (G') of the structure precursor is less than $1.2 \times 10^8$ Pa. Specifically, it is possible to set the temperature at which the storage elastic modulus (G') of the structure precursor is less than $1.2 \times 10^8$ Pa by setting the temperature to a temperature higher than a glass transition temperature or crystallization temperature of the structure precursor. However, it is more preferable to apply a temperature that is 10° C. or more higher than a melting point or softening point of the structure precursor and not more than a thermal decomposition temperature of the structure precursor. In the heating step, when the storage elastic modulus (G') of the structure precursor is $1.2 \times 10^8$ Pa or more, shaping to a mold (formation of a shape) may be difficult. Thus, in the heating step, it is important to heat the structure precursor to the temperature at which the storage elastic modulus (G') of the structure precursor is less than $1.2 \times 10^8$ Pa.

In the manufacturing method of the present invention, in the shaping step, it is necessary to expand the structure precursor by heating to be shaped to bring into close contact with the first member. By the expansion of the structure precursor at this time, the structure precursor is in close contact with and integrated with the first member, and the first member and the second member are compounded to obtain a composite structure. Further, voids are formed by expanding the structure precursor in the shaping step, thereby converting the structure precursor into a structure material to be a second member. At this time, the heating step and the shaping step may be performed by different apparatuses. For example, in view of effectively heating the structure precursor, in the heating step, heating is performed such that a heating source and the structure precursor are in contact with each other, and in the shaping step, the heating source is separated to facilitate expansion. When the heating step and the shaping step are performed in different apparatuses, the heating step and the shaping step are performed as separate steps. Further, in view of productivity, it is preferable to perform the heating step and the shaping step in the same apparatus, and it is possible to suppress the temperature drop of the molding member during transfer between the apparatuses. When the heating step and the shaping step are performed in the same apparatus, the heating step and the shaping step are performed continuously or in parallel in one step. The storage elastic modulus of the structure precursor starts to decrease by heating in the heating step, and the expansion of the structure precursor in the shaping step is started when the storage elastic modulus falls below a certain storage elastic modulus which varies depending on the used structure precursor. At this time, when the decrease in storage elastic modulus is rapid (when the temperature rise during heating is rapid), the expansion of the structure precursor is started slightly later, and is continuously performed in one step. Also, when the decrease in storage elastic modulus is moderate (when the temperature rise during heating is moderate), the expansion of the structure precursor is performed in parallel with the heating in the heating step.

The temperature of the shaping step cannot be uniformly defined because it is affected by the degree of expansion of the structure precursor and the storage elastic modulus of the structure precursor, and is not particularly limited. On the other hand, the time of the shaping step is preferably 15 seconds or more, more preferably 30 seconds or more, and further preferably 1 minute or more. There is no particular upper limit on the time of the shaping step, but it is preferably 30 minutes or less, and more preferably 10 minutes or less, in view of shortening molding cycle.

In the manufacturing method of the present invention, in the cooling step, it is necessary to cool the composite structure. The cooling method and time are not particularly limited, but it is preferable to lower the temperature down to a temperature at which the storage elastic modulus (G') of the structure material as the second member is $1.2 \times 10^8$ Pa or more. In view of suppressing deformation when handling the composite structure, it is preferable that the storage elastic modulus of the structure material as the second member is higher. Specifically, it is preferable that the temperature is preferably 30° C. or more, and preferably 50° C. or more lower than the melting point or softening point of the structure material as the second member, in view of shortening the molding cycle.

It is preferable that the method for manufacturing a composite structure according to the present invention includes a molding step of molding the composite structure 2 by pressurization, after the shaping step. By pressurizing the second member in close contact with the first member together with the first member, a composite structure having a more complicated shape can be obtained. At this time, since the second member is in an expansive state, it can also follow molding to a complicated shape. Examples of a method of the molding step of molding the composite structure by pressurization include a method of arranging a composite structure in a mold attached to a pressing machine, and pressurizing the composite structure to form a shape on a surface, and the like. The molding step may be performed between the shaping step and the cooling step, or may be performed after the cooling step.

The method for manufacturing a composite structure according to the present invention preferably includes a deformation step of locally applying pressure to deform the composite structure, after the shaping step. Since the second member is in the expansive state similar to the molding step described above, it can also follow complicated deformation. Examples of a method of the deformation step of locally applying pressure to deform the composite structure include a method of fixing to a bender or a clamp and locally applying pressure to deform the shape, and the lie. Also, when the composite structure is partially deformed as in bending deformation, it is preferable to heat at least a part of a portion to be deformed in the deformation step, and it is also possible not to selectively heat a position not desired to be deformed simultaneously. This deformation step may be performed between the shaping step and the cooling step, or may be performed after the cooling step.

<First Member>

In the manufacturing method of the present invention, the first member is required to have a bending modulus of 5 GPa or more and more preferably 8 GPa or more at the temperature of the heating step. When the bending modulus of the first member is 5 GPa or more at the heating temperature in the heating step, it is preferable also from the points that the shape can be maintained only by the first member, the first member can be used as a mold, and the use of other equipment such as fixation of the first member and the arrangement step can be simplified.

Also, a linear expansion coefficient of the first member is preferably $50 \times 10^{-6}/°$ C. or less. By using a member having such linear expansion coefficient as the first member, a target composite structure can be accurately manufactured, with a small dimensional change of the first member even by the heating in the heating step and the shaping step. Further, when the first member is largely shrunk by cooling in the cooling step from the state in which the second member is in close contact with the first member in the shaping step, the close contact state between the first member and the second member may decrease, thus the linear expansion coefficient of the first member is preferably $50 \times 10^{-6}/°$ C. or less.

The first member is preferably a member selected from the group consisting of fiber reinforced thermosetting resin members, fiber reinforced thermoplastic resin members, metal members, and ceramic members. In view of lightness in weight, it is preferable to use a fiber reinforced thermosetting resin member or a fiber reinforced thermoplastic resin member as the first member. In view of conductivity and heat dissipation, it is preferable to use a metal member as the first member. In view of heat resistance, wear resistance and corrosion resistance, it is preferable to use a ceramic member as the first member.

The fiber reinforced thermosetting resin member and the fiber reinforced thermoplastic resin member suitable as the first member are not particularly limited, but may be members including reinforced fibers and a thermosetting resin or thermoplastic resin described later. In particular, it is preferable in view of handleability that the reinforced fibers are in the form of a sheet impregnated with the resin in advance.

The metal member suitable as the first member is not particularly limited, and examples thereof include at least one selected from the group consisting of aluminum alloys, magnesium alloys, and titanium alloys. These metals can be selected according to the intended use and physical properties, and examples of the aluminum alloys include Al—Cu based A2017 and A2024, Al—Mn based A3003 and A3004, Al—Si based A4032, Al—Mg based A5005, A5052 and A5083, Al—Mg—Si based A6061 and A6063, Al—Zn based A7075, and the like. Moreover, an industrial pure aluminum to be a source of aluminum alloy may be used, and examples thereof include A1050, A1100, A1200, and the like. Examples of the magnesium alloy include Mg—Al—Zn-based AZ31, AZ61, AZ91, and the like. With regard to pure magnesium, a plate-like one has poor circulation, but may be used as a metal material of the present application. Examples of the titanium alloy may include alloys containing palladium of grades 11 to 23, alloys containing cobalt and palladium, Ti-6Al-4V corresponding to grade 50 (α alloy), grade 60 (α-β alloy), grade 80 (3 alloy), and the like. In addition, industrial pure titanium to be a source of titanium alloy may be used, and examples thereof include TP270H of grades 1 to 4, and the like.

The thickness of the first member is preferably 0.1 mm or more, and the thickness of the first member is more preferably 0.5 mm or more in view of suppressing unintended deformation with respect to the expansion of the structure precursor to be the second member and enhancing close contact with the second member, and further preferably 1.0 mm or more in view of handleability of the first member. The upper limit value of the thickness of the first member is not particularly limited, but is preferably 10 mm or less and more preferably 5 mm or less in view of lightness, shape moldability, and shape deformability. When the thickness of the first member is less than 0.1 mm, for example, in a case of using a metal foil or a resin film, handling may be difficult, and unintended deformation by the expansion of the structure precursor to be the second member cannot be suppressed, and the structure precursor cannot play a role as a mold, making it difficult to obtain a target composite structure, which is thus not preferable.

The shape of the first member is not particularly limited, and is desirably cylindrical columnar, polygonal columnar, or tubular, flat plate, L-shaped or box-shaped thereof. Among them, a tubular shape is preferable in view of easiness of manufacture of the composite structure, and the composite structure can be easily obtained even in an environment with no pressing machine or fixing jig after the heating step. In view of obtaining a large molded article, a flat plate, an L-shape or a box shape is preferable. Although a pressing machine, a fixing jig or the like is required, they can be obtained relatively easily, resulting in low cost.

<Second Member (Structure Material)>

The structure material as the second member used in the manufacturing method of the present invention includes a resin, reinforced fibers and voids.

In one mode of the present invention, the resin in the structure material desirably contains at least one or more thermoplastic resins. Examples of the thermoplastic resin include thermoplastic resins selected from crystalline plastics such as "polyesters such as polyethylene terephthalate (PET), polybutylene terephthalate (PBT), polytrimethylene terephthalate (PTT), polyethylene naphthalate (PEN), and liquid crystal polyesters; polyolefins such as polyethylene (PE), polypropylene (PP), and polybutylene; polyoxymethylene (POM), polyamide (PA), and polyarylene sulfides such as polyphenylene sulfide (PPS); polyketone (PK), polyether ketone (PEK), polyether ether ketone (PEEK), polyether ketone ketone (PEKK), polyether nitrile (PEN), and fluorine-based resins such as polytetrafluoroethylene; and liquid crystal polymers (LCP)", amorphous plastics such as "styrene-based resins, polycarbonate (PC), polymethyl methacrylate (PMMA), polyvinyl chloride (PVC), polyphenylene ether (PPE), polyimide (PI), polyamideimide (PAI), polyetherimide (PEI), polysulfone (PSU), polyether sulfone, and polyarylate (PAR)", phenol-based resins, phenoxy resins, polystyrene-based, polyolefin-based, polyurethane-based, polyester-based, polyamide-based, polybutadiene-based, polyisoprene-based, and fluorine-based resins, acrylonitrile-based and other thermoplastic elastomers, and copolymers and modified products thereof. Among them, polyolefin is desirably used in view of the lightness of the obtained structure material, polyamide is desirably used in view of the strength thereof, amorphous plastics such as polycarbonate and styrene-based resins are desirably used in view of the surface appearance thereof, polyarylene sulfides are desirably used in view of heat resistance, polyether ether ketone is desirably used in view of the continuous use temperature thereof, and fluorine-based resins are desirably used in view of the chemical resistance thereof.

In one mode of the present invention, the resin in the structure material desirably contains at least one or more thermosetting resins. Examples of the thermosetting resin include unsaturated polyesters, vinyl esters, epoxy resins, phenol resins, urea resins, melamine resins, thermosetting polyimides, copolymers and modified products thereof, and resins obtained by blending at least two of these.

In addition, the structure material or structure precursor according to the present invention may contain impact-resistant improvers such as elastomer and rubber components and other fillers and additive agents with respect to the resin, to the extent that the objects of the present invention are not impaired. Examples of the fillers and additive agents include inorganic fillers, fire retardants, conductivity imparting agents, nucleators, ultraviolet absorbers, antioxidants, damping materials, antibacterial agents, insect repellents, deodorants, anti-coloring agents, thermal stabilizers, mold release agents, antistatic agents, plasticizers, lubricants, colorants, pigments, dyes, foaming agents, anti-foaming agents, and coupling agents.

The structure material as the second member in the present invention preferably satisfies the following when the volume content of the structure material as the second member is defined as 100% by volume.

(1) The volume content of the resin is 2.5 to 85% by volume (2) The volume content of the reinforced fibers is 0.5 to 55% by volume (3) The volume content of the voids is 10 to 97% by volume The volume content of the resin in the structure material as the second member in the present invention is preferably within a range of 2.5% by volume or more and 85% by volume or less. When the volume content of the resin is 2.5% by volume or more, it is possible to bind the reinforced fibers within the structure material together to make the reinforcing effect of the reinforced fibers sufficient and to satisfy the mechanical properties, especially flexural properties of the structure material, which is thus desirable. In contrast, when the volume content of the resin is 85% by volume or less, it is preferable because formation of voids is not inhibited.

Examples of the reinforced fibers include metallic fibers formed of aluminum, brass, stainless, and the like, PAN-based, rayon-based, lignin-based, and pitch-based carbon fibers, graphite fibers, insulating fibers formed of glass and the like, organic fibers formed of aramid, PBO, polyphenylene sulfide, polyester, acrylic, nylon, polyethylene, and the like, and inorganic fibers formed of silicon carbide, silicon nitride, and the like. Further, surface treatment may be applied to these fibers. Examples of the surface treatment include, in addition to coating treatment with metal as a conductor, treatment with coupling agents, treatment with sizing agents, treatment with banding agents, adhesion treatment for additive agents, and the like. In addition, one of these fibers may be used alone, or two or more of them may be used in combination. Among them, PAN-based, pitch-based, and rayon-based carbon fibers, which are excellent in specific strength and specific stiffness, are desirably used in view of a weight reduction effect. Moreover, glass fibers are desirably used in view of increasing the economic efficiency of the obtained structure material as the second member, carbon fibers and glass fibers are desirably used in combination in view of a balance between mechanical properties and economic efficiency in particular. Furthermore, aramid fibers are desirably used in-view of increasing the impact absorption and shaping properties of the obtained structure material, carbon fibers and aramid fibers are desirably used in combination in view of a balance between mechanical properties and impact absorption in particular. Further, reinforced fibers coated with metal such as nickel, copper or ytterbium can also be used in view of increasing conductivity of the obtained structure material. Among these, PAN-based carbon fibers excellent in mechanical properties such as strength and elastic modulus can be more desirably used.

As described above, the volume content of the reinforced fibers in the structure material as the second member in the present invention is desirably within a range of 0.5% by volume or more and 55% by volume or less. When the volume content of the reinforced fibers is 0.5% by volume or more, it is possible to make the reinforcing effect derived from the reinforced fibers sufficient, which is thus desirable. In contrast, when the volume content of the reinforced fibers is 55% by volume or less, the volume content of the resin relative to the reinforced fibers is relatively high, and it is possible to bind the reinforced fibers within the structure material together to make the reinforcing effect of the reinforced fibers sufficient and to satisfy the mechanical properties, especially flexural properties of the structure material and the composite structure, which is thus desirable.

The reinforced fibers in the structure material as the second member are desirably discontinuous, and dispersed in a nearly monofilament form and in a random manner. The reinforced fibers are prepared in such a manner, whereby when a sheet-shaped structure precursor or structure material is molded by applying external force, shaping into a complex shape is facilitated. Further, the reinforced fibers are prepared in such a manner, whereby voids formed by the reinforced fibers become fine, and weak parts at fiber bundle ends of the reinforced fibers in the structure material can be minimized, and thus giving isotropy in addition to excellent reinforcing efficiency and reliability.

Here, the reinforced fibers in a nearly monofilament form indicates that a single yarn of the reinforced fibers is present as less than 500 fine-denier strands. Further desirably, it is in a monofilament form.

Being dispersed in a nearly monofilament form or monofilament form indicates that, for a reinforced fiber freely selected in the structure material as the second member, the rate of single filaments having a two-dimensional contact angle of 1° or more (hereinafter, also referred to as a fibers dispersed rate) is 80% or more, or in other words, that a bundle in which two or more single filaments in the structure material are in contact with each other to be parallel is less than 20%. Consequently, the mass fraction of a fiber bundle with a filament number of 100 or less at least in the reinforced fibers particularly preferably corresponds to 100%.

Figure 2:
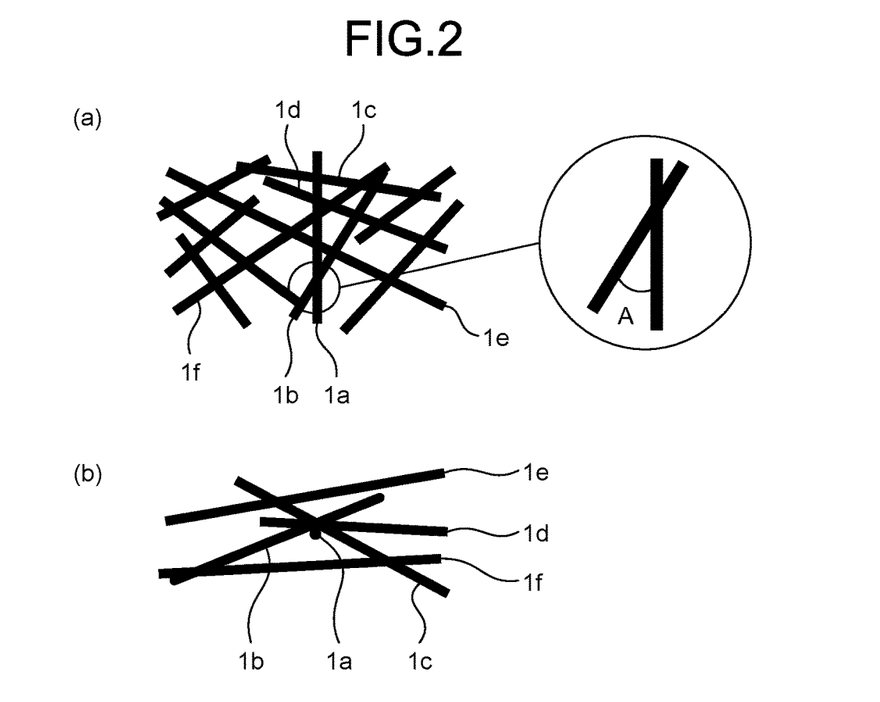
FIG. 2 shows schematic diagrams of an example of a dispersion state of reinforced fibers in a structure material as a second member according to the present invention.

The two-dimensional contact angle refers to an angle formed by a single filament and a single filament being in contact with this single filament in the case of discontinuous reinforced fibers, and is defined as an angle on an acute angle side within a range of 0° or more and 90° or less out of angles formed by the single filaments being in contact with each other. The two-dimensional contact angle will be further described with reference to a drawing. FIG. 2 shows schematic diagrams of an example of a dispersion state of reinforced fibers in a fiber-reinforced mat used for a structure material as a second member when observed in a planar direction (FIG. 2(a)) and a thickness direction (FIG. 2(b)). With reference to a single filament 1a, the single filament 1a is observed to cross single filaments 1b to 1f in FIG. 2(a), whereas the single filament 1a is not in contact with the single filaments 1e and 1f in FIG. 2(b). In this case, the single filaments 1b to 1d are objects for which the two-dimensional contact angle is evaluated for the single filament 1a as the reference, and the two-dimensional contact angle is an angle A on the acute angle side within a range of 0° or more and 90° or less out of the two angles formed by the two single filaments being in contact with each other.

A method for measuring the two-dimensional contact angle is not particularly limited, and for example, a method that observes orientation of the reinforced fibers from a surface of the structure material as the second member can be exemplified. In this case, the surface of the structure material is polished to expose the reinforced fibers, whereby the reinforced fibers become easier to be observed. Also, a method that performs X-ray CT transmission observation to take an orientation image of the reinforced fibers can be also exemplified. For the reinforced fibers having high X-ray transmissivity, fibers for a tracer are mixed into the reinforced fibers, or a chemical for a tracer is applied to the reinforced fibers, whereby the reinforced fibers become easier to be observed, which is thus desirable. Further, when measurement is difficult by the methods, a method that puts the structure material into a high-temperature environment to burn off a resin component with a heating furnace or the like and then observes the orientation of the reinforced fibers from the reinforced fibers that have been taken out using an optical microscope or an electron microscope can be exemplified.

The fibers dispersed rate is measured by the following procedure based on the observation method described above. Specifically, the two-dimensional contact angle is measured for all the single filaments (the single filaments 1b to 1d in FIG. 2) being in contact with a single filament (the signal filament 1a in FIG. 2) selected at random. This measurement is performed for 100 single filaments, and a rate is calculated from the ratio of the number of signal filaments having a two-dimensional contact angle of 1° or more to the total number of all the single filaments for which the two-dimensional contact angle is measured.

Furthermore, the reinforced fibers are particularly desirably dispersed in a random manner. The reinforced fibers being dispersed in a random manner indicates that the arithmetic mean of a two-dimensional oriented angle of a reinforced fiber freely selected in the structure material as the second member is within a range of 30° or more and 60° or less. The two-dimensional oriented angle refers to an angle formed by a single filament of the reinforced fiber and a single filament crossing the single filament of the reinforced fiber and is defined as an angle on an acute angle side within a range of 0° or more and 90° or less out of angles formed by the single filaments crossing each other.

The two-dimensional oriented angle will be further described using the drawings. In FIGS. 2(a) and 2(b), with reference to the single filament 1a, the single filament 1a crosses the other single filaments 1b to 1f. Here, the "crossing" means a state in which a single filament as a reference is observed to cross other single filaments on a two-dimensional plane observed, does not necessarily require the single filament 1a and the single filaments 1b to 1f to be in contact with each other, and does not exclude a state in which the single filament 1a is observed to cross the single filaments 1b to 1f when viewed in a projected manner. That is, focusing on the single filament 1a as the reference, all the single filaments 1b to 1f are objects for which the two-dimensional oriented angle is evaluated, and in FIG. 2(a), the two-dimensional oriented angle is the angle A on the acute angle side within a range of 0° or more and 90° or less out of the two angles formed by the two crossing single filaments.

A method for measuring the two-dimensional oriented angle is not particularly limited, and a method can be exemplified that observes the orientation of the reinforced fibers from a surface of the structure element, for example, for which means similar to the method for measuring the two-dimensional contact angle described above can be employed. The mean of the two-dimensional oriented angle is measured by the following procedure. Specifically, the mean of the two-dimensional oriented angle is measured for all the single filaments (the single filaments 1b to 1f in FIG. 2) crossing a single filament selected at random (the signal filament 1a in FIG. 2). For example, when there are a large number of other single filaments crossing a single filament, an arithmetic mean measured by selecting 20 other crossing single filaments at random may be substituted. This measurement is repeated a total of five times with reference to other single filaments, and its arithmetic mean is calculated as the arithmetic mean of the two-dimensional oriented angle.

The reinforced fibers are dispersed in a nearly monofilament form and in a random manner, whereby the performance given by the reinforced fibers dispersed in a nearly monofilament form described above can be increased to the maximum. In addition, isotropy can be imparted to the mechanical properties in the structure material as the second member. In view of the foregoing, the fibers dispersed rate of the reinforced fibers is desirably 90% or more and more desirably closer to 100%. Also, the arithmetic mean of the two-dimensional oriented angle of the reinforced fibers is desirably within a range of 40° or more and 50° or less and more desirably closer to 45°, which is an ideal angle.

On the other hand, examples of the reinforced fibers not having a non-woven fabric form include a sheet substrate, a woven fabric substrate, and a non-crimped substrate in which the reinforced fibers are arranged in one direction, and the like. These forms arrange the reinforced fibers regularly and densely, and thus there are few voids in the structure material, which makes impregnation of the resin extremely difficult and may form an unimpregnated part or significantly restrict alternatives of impregnating means and resin type.

The form of the reinforced fibers may be any of a continuous reinforced fiber having a length similar to that of the structure material and a discontinuous reinforced fiber with a finite length cut-into a certain length, and it is desirably a discontinuous reinforced fiber in view of easily impregnating the resin or being able to easily adjust the amount of the resin.

The reinforced fibers in the present invention desirably have a non-woven fabric-like form, in view of easiness of impregnation of the resin into the reinforced fibers. Furthermore, the reinforced fibers have a non-woven fabric-like form, whereby in addition to easy handleability of the non-woven fabric itself, impregnation can be made easy even in the case of thermoplastic resins which are generally high in viscosity, which is thus desirable. The non-woven fabric-like form indicates a form in which strands and/or monofilaments of the reinforced fibers are dispersed irregularly in a planar form, and examples thereof include a chopped strand mat, a continuous strand mat, a paper-making mat, a carding mat, an air-laid mat, and the like (hereinafter, collectively referred to as a fiber-reinforced mat).

Examples of a method for manufacturing the fiber-reinforced mat included in the structure material as the second member, include a method for manufacturing the fiber-reinforced mat by dispersing the reinforced fibers in a strand and/or a nearly monofilament form in advance. Examples of the method for manufacturing the fiber-reinforced mat include dry steps such as an air-laid method that forms the reinforced fibers into a dispersion sheet with an airflow and a carding method that shapes the reinforced fibers while mechanically carding the reinforced fibers to form a sheet and a wet step by Radright method that stirs the reinforced fibers in water to make paper as known techniques. Examples of means for making the reinforced fibers closer to a monofilament form include, in the dry step, a method that provides fiber-opening bars, a method that vibrates fiber-opening bars, a method that makes meshes of a card finer, a method that adjusts a rotational speed of a card, and the like. Examples thereof include, in the wet step, a method that adjusts stirring conditions of the reinforced fibers, a method that dilutes a reinforced fiber concentration of a dispersion, a method that adjusts viscosity of a dispersion, a method that inhibits an eddy when a dispersion is transferred, and the like. In particular, the fiber-reinforced mat is desirably manufactured by the wet method, and the concentration of the reinforced fibers is increased or the flow rate (flow) of a dispersion and the speed of a mesh conveyor are adjusted, whereby the rate of the reinforced fibers in the fiber-reinforced mat can be easily adjusted. For example, the speed of the mesh conveyor is decreased relative to the flow rate of the dispersion, whereby the orientation of fibers in an obtained fiber-reinforced mat is difficult to be directed to a drawing direction, and a bulky fiber-reinforced mat can be manufactured. The fiber-reinforced mat may be formed of the reinforced fibers alone, the reinforced fibers may be mixed with a matrix resin component in a powdery form or a fibrous form, the reinforced fibers may be mixed with organic compounds or inorganic compounds, or the reinforced fibers may be bonded to each other with a resin component.

A longer of the mass mean fiber length of the reinforced fibers of the present invention is desirably within a range of 1 mm or more and 15 mm or less. With this length, the reinforcing efficiency of the reinforced fibers can be increased, and thus excellent mechanical properties can be imparted to the structure material as the second member. When the longer of the mass mean fiber length of the reinforced fibers is 1 mm or more, it is possible to form the voids in the structure material efficiently, thus the density can be reduced, and in other words, it is possible to obtain a lightweight structure material even with the same thickness, which is thus desirable. In contrast, when the longer of the mass mean fiber length of the reinforced fibers is 15 mm or less, the reinforced fibers are unlikely to bend by their self-weight in the structure material, and the expression of mechanical properties is not inhibited, which is thus desirable. The resin component of the structure material is removed by a method such as burning or eluting, 400 remaining reinforced fibers are selected at random, and the lengths of the reinforced fibers are measured down to 10 µm, and the longer of the mass mean fiber length can be calculated as the mean length thereof.

The voids in the present invention each indicate a space formed by the reinforced fibers coated with the resin serving as columnar supported bodies and overlapping with each other or crossing each other. When a structure precursor in which the reinforced fibers are impregnated with the resin in advance is heated to obtain a structure material, for example, melting or softening of the resin along with heating raises the reinforced fibers to form the voids. This is based on a characteristic of the reinforced fibers inside the structure precursor in a compressed state by pressurization rising by hair raising force caused by their elastic modulus.

As described above, the volume content of the voids in the structure material as the second member is preferably within a range of 10% by volume or more and 97% by volume or less. When the volume content of the voids is less than 10% by volume, the density of the structure material is low, thus lightness can be satisfied, which is thus desirable. In contrast, when the content of the voids is 97% by volume or less, in other words, the thickness of the resin coated around the reinforced fibers is sufficient, thus it is possible to perform the reinforcing of the reinforced fibers in the structure material sufficiently to enhance mechanical properties, which is thus desirable. The upper limit value of the content of the voids is desirably 97% by volume. In the present invention, as to the volume content, the sum of the respective volume contents of the resin, the reinforced fibers, and the voids included in the structure material is defined as 100% by volume.

When the bending modulus of the structure material as the second member according to the present invention is Ec and the density of the structure material is p, the specific bending stiffness of the structure material represented as $Ec^{1/3} \cdot \rho^{-1}$ is desirably within a range of 3 or more and 20 or less. When the specific bending stiffness of the structure material is 3 or more, the bending modulus is high, the density is low, and a desired weight reduction effect can be obtained, which is thus desirable. In contrast, the upper limit value of the specific bending stiffness of the structure material is not particularly limited, but is desirably 20 or less, and an upper limit value of 20 or less is desirable in view of excellent balance between the weight reduction effect and the bending modulus. The specific bending stiffness of steel materials and aluminum is 1.5 or less in general, which is a region of specific bending stiffness extremely excellent compared with these metallic materials. Furthermore, the specific bending stiffness of the structure material is 3 or more exceeding 2.3, which is a general specific bending stiffness of carbon fiber-reinforced plastic composite materials attracting attention for their weight reduction effect, and further desirably 5 or more.

The bending modulus Ec of the structure material of the present invention may be 3 GPa or more and desirably 6 GPa or more. When the bending modulus Ec of the structure material is 3 GPa or more, it is desirable because the range of use as the structure material can be expanded. Further, in order to facilitate the design of the structure material, it is desirable that the bending modulus has isotropy. While the upper limit of the bending modulus is not limited, in general, in the structure material composed of the reinforced fibers and the resin, a value calculated from the respective elastic moduli of the reinforced fibers and the resin as its components can be the upper limit. In the structure material according to the present invention, both when the structure material is used alone and when it is used in combination with another member, a member is designed using the bending modulus of the structure material itself, and 50 GPa is enough for practical use.

The density ρ of the structure material as the second member of the present invention is desirably 0.9 g/cm$^3$ or less. When the density ρ of the structure material is 0.9 g/cm$^3$ or less, it means that mass as the structure material decreases, and as a result, it contributes to reduction in mass when being made into a product, which is thus desirable. While the lower limit of the density is not limited, in general, in the structure material composed of the reinforced fibers and the resin, a value calculated from the respective volume ratios of the reinforced fibers, the resin and the voids as its components can be the lower limit. In the structure material according to the present invention, while the density of the structure material itself is different depending on the reinforced fibers and the resin to be used, both when the structure material is used alone or and when it is used in combination with another member, the density is desirably 0.03 g/cm$^3$ or more in view of maintaining the mechanical properties of the structure material.

<Structure Precursor>

The structure precursor used in the manufacturing method of the present invention includes at least a resin and reinforced fibers. The resin and the reinforced fibers can be selected from the materials described above according to the purpose.

Then, the volume content of the resin in the structure precursor used in the manufacturing method of the present invention is preferably within a range of 2.5% by volume or more and 95% by volume or less. When the volume content of the resin is 2.5% by volume or more, it is possible to bind the reinforced fibers within the structure material together to make the reinforcing effect of the reinforced fibers sufficient and to satisfy the mechanical properties, especially handleability of the structure precursor, which is thus desirable.

The volume content of the reinforced fibers in the structure precursor used in the manufacturing method of the present invention is desirably within a range of 0.5% by volume or more and 85% by volume or less. When the volume content of the reinforced fibers is 0.5% by volume or more, it is possible to make the reinforcing effect derived from the reinforced fibers sufficient, which is thus desirable. On the other hand, when the volume content of the reinforced fibers is 85% by volume or less, it is possible to make the reinforcing effect of the reinforced fibers sufficient and to satisfy the mechanical properties, especially flexural properties of the structure material, which is thus desirable.

The voids in the structure precursor used in the manufacturing method of the present invention each indicate a space formed by the reinforced fibers coated with the resin serving as columnar supported bodies and overlapping with each other or crossing each other. For example, when the reinforced fibers are impregnated with the resin in advance to obtain a structure precursor, there are a method of making the state of impregnation of resin incomplete and a method of forming voids by removing from the state completely impregnated with the resin. Alternatively, there is a method of forming voids by heating the structure precursor in which the reinforced fibers are impregnated with the resin to raise the reinforced fibers by melting or softening of the resin along with the heating.

The volume content of the voids in the structure precursor is desirably within a range of 0% by volume or more and 30% by volume or less. When the content of the voids is 30% by volume or less, the degree of expansion can be increased in the shaping step, so that the amount of arrangement of the structure precursor arranged in the first member can be reduced, and the arrangement step can be simplified, which is thus preferable. In the present invention, as to the volume content, the sum of the respective volume contents of the resin, the reinforced fibers and the voids included in the structure precursor is defined as 100% by volume.

The structure precursor used in the manufacturing method of the present invention desirably includes a mat including reinforced fibers and a matrix resin including either a thermosetting resin or a thermoplastic resin, and the mat including the reinforced fibers is desirably impregnated with the resin in advance. Using such a structure precursor enables it to be easily arranged in the first member and enables easy preforming even for a complicated shape in the arrangement step. The mat including reinforced fibers desirably has a non-woven fabric-like form manufactured by any of a wet paper making method, a dry paper making method, an air-laid method, and a weaving method. The reinforced fibers desirably have a non-woven fabric-like form, in view of easiness of impregnation of the resin into the reinforced fibers. Furthermore, the reinforced fibers have a non-woven fabric-like form, whereby in addition to easy handleability of the non-woven fabric itself, impregnation can be made easy even in the case of thermoplastic resins, which are generally high in viscosity, which is thus desirable. In addition, using such a structure precursor including the non-woven fabric can easily obtain a structure material light and excellent in mechanical properties. Moreover, in the present invention, the thermosetting resin and the thermoplastic resin may be blended with each other, and in that case, a component with an amount exceeding 50% by mass of the components included in the resin is the name of the resin.

As equipment for implementing the methods, a compression molding machine or a double belt press can be suitably used. The former is for a batch type, and an intermittent type press system arranging two or more machines for heating and cooling in a row can improve productivity. The latter is for a continuous type, which can easily perform continuous processing and is thus excellent in continuous productivity.

Examples of the fiber-reinforced mat not having a non-woven fabric include a sheet substrate, a woven fabric substrate, and a non-crimped substrate in which the reinforced fibers are arranged in one direction, and the like. These forms arrange the reinforced fibers regularly and densely, thus there are few voids in the fiber-reinforced mat, and the thermoplastic resin does not form a sufficient anchoring structure, thus when it is made into a core forming layer, bonding ability decreases. In addition, when the resin is a thermoplastic resin, impregnation is extremely difficult, which forms an unimpregnated part or significantly restricts alternatives of impregnating means and resin type.

The matrix resin included in the structure precursor is desirably given in any form of film, particles, fibers, and liquid. With this form, the mat including the reinforced fibers can be easily impregnated with the resin.

The structure precursor desirably contains a foaming agent. The structure material as the second member can be thereby foamed more easily, which is thus desirable in view of weight reduction. In addition, high shaping properties can be expressed for a finer mold shape. The foaming agent includes a physical foaming agent that achieves foaming through bursting of compressed gas or a physical change of gas or the like and a chemical foaming agent that produces gas through thermal decomposition or a chemical reaction. Among them, a chemical foaming agent that produces nitrogen gas or carbonic acid gas through thermal decomposition is referred to as a thermal decomposition type chemical foaming agent. The thermal decomposition type chemical foaming agent is a compound that is liquid or solid at normal temperature and is a compound that decomposes or gasifies when being heated. Also, it is preferable that the thermal decomposition type chemical foaming agent is one that does not substantially interfere with a step of manufacturing the structure precursor used in the method for manufacturing a structure material as the second member according to the present invention, and the decomposition temperature of the thermal decomposition type chemical foaming agent is preferably within a range of 180° C. to 250° C. Examples of such a thermal decomposition type chemical foaming agent include azodicarbonamide, metal azodicarboxylates, dinitrosopentamethylenetetramine, N,N-dinitrosopentamethylenetetramine, 4,4-oxybis, bistetrazol diammonium; and the like.

<Integrated Composite Structure>

An integrated composite structure can be manufactured by integrating another member with at least a part of a surface of the composite structure of the present invention.

The method for manufacturing an integrated structure material of the present invention is a method for manufacturing an integrated structure material including further integrating another member with at least a part of a surface of the composite structure obtained by the manufacturing method of the present invention.

The another member referred herein is not particularly limited, and examples thereof include members to be a connecting part for attaching the composite structure to a product, a gripping part for accommodating in the product, and a covering part for embedding in the product.

The method for integrating another member with the composite structure is not particularly limited, and for example, there are a method of integrating using an adhesive, and a method of integrating using a bolt and a screw. When integrated with a thermoplastic member, heat welding, vibration welding, ultrasonic welding, laser welding, insert injection molding, outsert injection molding or the like is preferably used. Outsert molding or insert molding is preferably used in view of molding cycle.

Examples of the composite structure and the integrated structure material obtained by the manufacturing method of the present invention include electric and electronic device parts such as "housings, trays, chassis, interior members, or cases of personal computers, displays, OA devices, cellular phones, mobile information terminals, PDAs (mobile information terminals such as electronic notepads), video cameras, optical devices, audio devices, air conditioners, lighting devices, entertainment goods, toy goods, and other home appliances"; "various kinds of members, various kinds of frames, various kinds of hinges, various kinds of arms, various kinds of wheel axles, various kinds of bearings for wheels, and various kinds of beams"; "outer plates and body parts such as hoods, roofs, doors, fenders, trunk lids, side panels, rear end panels, front bodies, under bodies, various kinds of pillars, various kinds of members, various kinds of frames, various kinds of beams, various kinds of supports, various kinds of rails, and various kinds of hinges"; exterior parts such as "bumpers, bumper beams, moldings, under covers, engine covers, current plates, spoilers, cowl louvers, and aerodynamic parts"; interior parts such as "instrument panels, seat frames, door trims, pillar trims, steering wheels, and various kinds of modules"; structure parts for automobiles and two-wheeled vehicles such as "motor parts, CNG tanks, and gasoline tanks"; parts for automobiles and two-wheeled vehicles such as "battery trays, headlamp supports, pedal housings, protectors, lamp reflectors, lamp housings, noise shields, and spare tire covers"; building materials such as "wall members such as sound insulation walls and soundproofing walls"; parts for aircraft such as "landing gear pods, winglets, spoilers, edges, rudders, elevators, fairings, ribs, and seats"; and sporting goods and structure materials for sporting goods such as "golf shafts, various frames of rackets, bicycles, a wheelchair and the like, fishing rods, ski boards, and snowboards". In view of mechanical properties, these are desirably used for automobile interior and exterior, electric and electronic device housings, bicycles, structure materials for sporting goods, aircraft interior materials, boxes for transportation, and building materials. Among them, the structure material is particularly suitable for module members composed of a plurality of parts. Also, a cylindrical columnar, polygonal columnar, tubular structure material thereof obtained by the manufacturing method of the present invention can be used, for example, for pillars of automobiles, frames of bicycles, racket frames and shafts for various kinds of sports competitions, columns and beams of buildings, or the like.

EXAMPLES

Hereinafter, the present invention will be specifically described with reference to examples. However, the present invention is not limited to the following examples.

<Evaluation and Measurement Method>

(1) Density ρ of Structure Material as Second Member

A test piece was cut out of a structure material, and an apparent density of the structure material was measured with reference to JIS K7222 (2005). The test piece was cut out to be 100 mm long and 100 mm wide. The length, width, and thickness of the test piece were measured with a micrometer, and a volume V of the test piece was calculated from the obtained value. Moreover, a mass M of the cut-out test piece was measured with an electronic balance. An apparent density ρ was calculated by the obtained mass M and volume V, and the following expression.

$$\rho[g/cm^3]=10^3 \times M[g]/V[mm^3]$$

(2) Bending Test

A flat plate with a composition similar to that of each of the structure materials as the second member obtained in the examples and comparative examples was prepared so as to have a thickness described in ISO 178 Method (1993) as a test piece. Test pieces were cut out of the prepared flat plate, and the bending modulus of the test pieces was measured in accordance with ISO 178 Method (1993). As to the test pieces, test pieces cut out in four directions including a 0° direction freely set and +45°, −45°, and 90° directions were prepared. The number of measurement was set to n=5 for each of the directions, and its arithmetic mean was defined as a bending modulus Ec. As to a measurement apparatus, "INSTRON" (registered trademark) model 5565 universal material testing system (manufactured by INSTRON JAPAN Co., Ltd.) was used. From the obtained result, the specific bending stiffness of a molded article was calculated by the following expression.

Specific bending stiffness=$Ec^{1/3}/\rho$ (3) Storage Elastic Modulus (G') of Structure Precursor For a measurement sample (0.5 mm thick and 10 mm wide) of a structure precursor, evaluation was performed by dynamic viscoelasticity analysis (DMA), by raising temperature under conditions with a temperature raising rate of 5° C./min, a twisting vibration frequency of 0.5 Hz, and a strain amount of 0.1%. In this evaluation condition, a storage elastic modulus (G') at an ultimate temperature of the structure precursor in each step was determined. Here, ARES manufactured by TA Instruments product was used as a measurement apparatus.

(4) Isothermal Bending Test (Bending Modulus of First Member at Temperature of Heating Step)

Using the first member as a test piece, a flat plate was prepared in the same manner as in (2). The test piece was cut out of the prepared flat plate, and the bending modulus was measured in a thermostat set so as to be a temperature of the heating step selected from the measurement result of (3). The arithmetic mean of the obtained results was defined as a bending modulus E1 of the first member.

(5) Evaluation of Linear Expansion Coefficient of Each Member

The linear expansion coefficient of the first member was evaluated with reference to "Testing method for linear thermal expansion coefficient of plastics by thermomechanical analysis" defined in JIS K7197 (1991). As a test piece in this evaluation, each member obtained by in examples or comparative examples was used. At this time, the thickness was set to the thickness of each member and the length of one side was processed to be 5 mm to prepare a test piece. The number of measurements was set to n=5, and the mean was defined as a linear expansion coefficient of each member.

(6) Volume Content Vf of Reinforced Fibers in Structure Material as Second Member After a mass Ws of a structure material was measured, the structure material was heated at 500° C. for 30 minutes in the air to burn off a resin component, a mass Wf of remaining reinforced fibers was measured, and a volume content Vf was calculated by the following expression.

$Vf$ (% by volume)=$(Wf/\rho f)/\{Wf/\rho f+(Ws-Wf)/\rho r\}\times 100$ $\rho f$: Density of reinforced fibers (g/cm$^3$)
$\rho r$: Density of resin (g/cm$^3$)

(7) Volume Content of Voids of Structure Material as Second Member

A test piece of 10 mm long and 10 mm wide was cut out of the structure material, and a section was observed with a scanning electron microscope (SEM) (model S-4800 manufactured by Hitachi High-Technologies Corporation) to photograph ten sites at regular intervals from the surface of the structure material with a 1,000-fold magnification. For each image, an area $A_a$ of voids within the image was determined. Furthermore, the area $A_a$ of the voids was divided by the area of the entire image to calculate a porosity. The volume content of the voids of the structure material was determined by an arithmetic mean from the porosity at a total of 50 sites photographed at ten sites each for five test pieces.

In the structure material as the second member, in order to determine a case when the porosity of a part to the midpoint position in the thickness direction from the surface and the porosity of the residual part are different from each other, the volume content of voids was calculated for each of the ten sites photographed at regular intervals, and the volume content of voids within a range of 0% by volume or more and less than 10% by volume and the volume content of voids within a range of 10% by volume or more and 99% by volume or less were separately determined.

(8) Volume Content of Resin in Structure Material as Second Member

Using the values of the volume content Vf of reinforced fibers and the volume content Va of voids in the structure materials determined by (6) and (7), a volume content Vr of resin was determined by the following equation.

$Vr$ (% by volume)=$100-(Vf+Va)$

Vr: Volume content of resin (% by volume)
Vf: Volume content of reinforced fibers (% by volume)
Va: Volume content of voids (% by volume)

(9) Volume Contents of Reinforced Fibers, Resin, and Voids of Structure Precursor The volume contents were determined in the same manner as in (6) to (8) above.

<Materials Used>

The materials used for the evaluation are shown below.

[Material 1]

A copolymer with polyacrylonitrile as a main component was subjected to spun processing, calcined processing, and surface oxidation treatment processing to obtain a continuous carbon fiber with a total single yarn number of 12,000. The properties of the reinforced fiber as this continuous carbon fiber were as follows.

Figure 3:
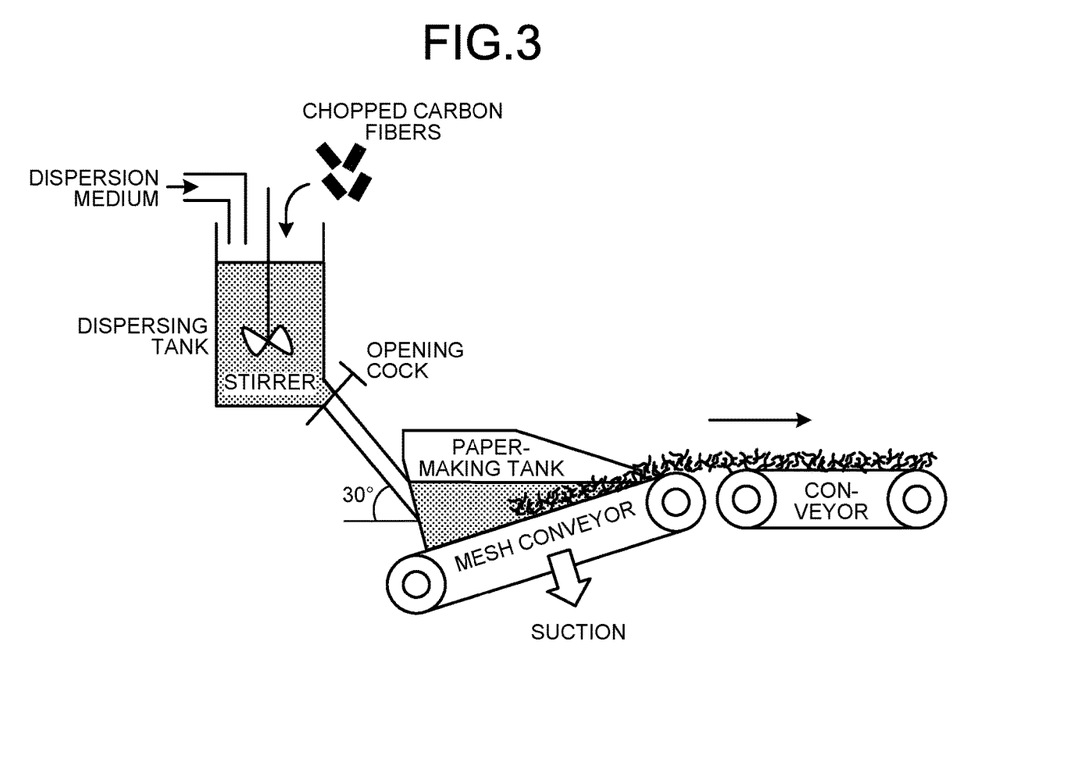
FIG. 3 shows a schematic diagram of an example of an apparatus for manufacturing a fiber-reinforced mat.

Single filament diameter: 7 μm
Mass per unit length: 1.6 g/m
Specific gravity: 1.8
Tensile strength: 4600 MPa
Tensile modulus: 220 GPa The obtained Reinforced Fiber 1 was cut into 6 mm with a strand cutter to obtain chopped carbon fibers. A dispersion with a concentration of 0.1% by mass containing water and a surfactant (polyoxyethylene lauryl ether (product name) manufactured by nacalai tesque) was prepared. Using this dispersion and the chopped carbon fibers, a paper-making substrate was manufactured using an apparatus for manufacturing a paper-making substrate shown in FIG. 3. The manufacturing apparatus includes a cylindrical vessel with a diameter of 1,000 mm having an opening cock at the lower part of the vessel as a dispersing tank and a linear transportation unit (an inclination angle of 30°) connecting the dispersing tank and a paper-making tank. A stirrer is attached to an opening at the top surface of the dispersing tank, and the chopped carbon fibers and the dispersion (dispersion medium) can be charged from the opening. The paper-making tank includes a mesh conveyor having a paper-making face with a width of 500 mm on its bottom, and a conveyor that can convey a carbon fiber substrate (a paper-making substrate) is connected to the mesh conveyor. Paper-making was performed with a carbon fiber concentration in the dispersion of 0.05% by mass. The carbon fiber substrate obtained by paper-making was dried in a drying furnace at 200° C. for 30 minutes. The obtained carbon fiber substrate had a width of 500 mm, a length of 500 mm, and a weight per unit area of 100 g/m$^2$.

A sheet with a weight per unit area of 100 g/m$^2$ formed of 80% by weight of an unmodified polypropylene resin ("Prime Polypro" J105G manufactured by PRIME POLYMER Co., Ltd.) and 20% by weight of an acid-modified polypropylene resin ("ADMER" QB510 manufactured by Mitsui Chemicals, Inc.) as resins was prepared. The obtained carbon fiber substrate and resin sheet were laminated so as to form resin sheet/carbon fiber substrate/resin sheet to obtain a layered article. The obtained layered article was put between two metallic plates and was subjected to pressurization and heating together with the metallic plates with a surface pressure of 3 MPa by a pressing machine with a platen temperature of 230° C. Five minutes later, the pressurization by the pressing machine was stopped, and pressurization and cooling were performed with a surface pressure of 3 MPa by a pressing machine with a platen temperature of 100° C. Five minutes later, the pressurization by the pressing machine was stopped to obtain Material 1 with a thickness of 0.28 mm and a volume content of the reinforced fibers of 20% as a structure precursor. The storage elastic modulus (G') of the structure precursor measured by the above measurement method was $1.5 \times 10^6$ Pa.

[Material 2]

"TORAYCA" prepreg P3252S-12 manufactured by Toray Industries, Inc. was named Material 2.

[Material 3]

Using the chopped carbon fibers and the polypropylene resin used in Material 1, the polypropylene resin was melted and kneaded with a biaxial extruder with a cylinder temperature set at 230° C., then the chopped carbon fibers were charged from a side feeder of the extruder, and the mixture was further kneaded. The kneaded resin was pulled out in a gut form, was cooled, and was then processed into pellets with a length of 6 mm to obtain Material 3 with a volume content of the reinforced fibers of 20% as a structure precursor.

Example 1

Figure 4:
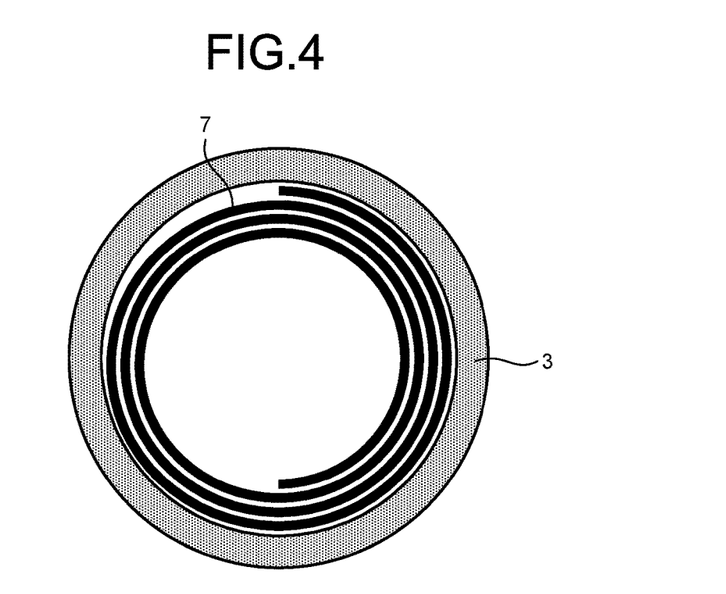
FIG. 4 shows a schematic diagram for illustrating the manufacturing method of Example 1.

As a first member, an aluminum alloy pipe with an inner diameter of 30 mm, a length of 300 mm and a thickness of 3 mm was prepared. A structure precursor of a second member was prepared by cutting out Material 1 in a size of a length of 300 mm and a width of 850 mm. As shown in FIG. 4, the obtained structure precursor 7 was wound into a tube and arranged in the pipe 3. Subsequently, it was put into a hot air drier at an ambient temperature set to 230° C., and the resin (the polypropylene resin used in Material 1) was brought into a molten state. Using a similar configuration, in a pre-study, a time for raising a temperature of a central part of the structure precursor 7 to around the set temperature with a thermometer inserted in the central part of the structure precursor 7 was measured and reflected the time on molding conditions. At this time, expansion started gradually from a point where the resin was melted, and the inside of the pipe 3 was filled with the core 8 (second member) including the resin 4, the reinforced fibers 5 and the voids 6 as shown in FIG. 1. Thereafter, the pipe 3 was taken out of the drier and cooled to obtain a composite structure. Physical properties, conditions and the like are shown in Table 1.

Example 2

As a first member, a pipe was prepared using Material 2 so as to have the same shape as that of Example 1. At this time, the length direction of the pipe was set to 00, and Material 2 was laminated so as to have a configuration of [0°/90°/0°/90°/0°/90°/0°/90°/0°/90°/0°/90°/90°/0°/90°/0°/90°/0°/90°/0°], wound around a core material with an outer diameter of 30 mm, and molded at 130° C. for 2 hours in an autoclave. A composite structure was obtained in the same manner as in Example 1 except that the obtained carbon fiber reinforced thermosetting resin pipe was used. Physical properties, conditions and the like are shown in Table 1.

Example 3

Figure 5:
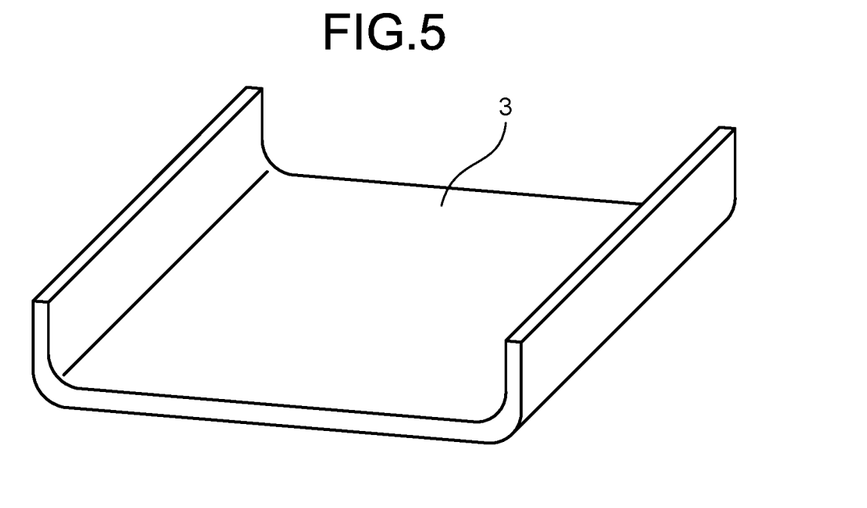
FIG. 5 shows a schematic perspective view for illustrating a first member used in Example 3.

As a first member, two aluminum alloy boxes having a length of 300 mm, a width of 300 mm, a height of 5 mm, and a thickness of 2 mm in which the section is a shape of "U" as shown in FIG. 5 were prepared. A second member composed of ten pieces of Material 1 cut out into a length of 300 mm and a width of 300 mm was arranged in the boxes. Then, a composite structure was obtained in the same manner as in Example 1 except that the height of the boxes was fixed to 15.2 mm and the shaping step was performed for 2 minutes. Physical properties, conditions and the like are shown in Table 1.

Example 4

As a first member, a box was prepared using Material 2 so as to have the same shape as that of Example 3. At this time, the length direction of the box was set to 00, and Material 2 was laminated so as to have a configuration of [0°/90°/0°/90°/0°/90°/0°/90°/90°/90°/0°/90°/0°/90°/0°/90°/0°], shaped into a square core material with a length of 300 mm, a width of 300 mm and a height of 15.2 mm, and molded at 130° C. for 2 hours in an autoclave. A composite structure was obtained in the same manner as in Example 1 except that the obtained carbon fiber reinforced thermosetting resin box was used and the shaping step was performed for 0.5 minutes. Physical properties, conditions and the like are shown in Table 1.

Example 5

Figure 6:
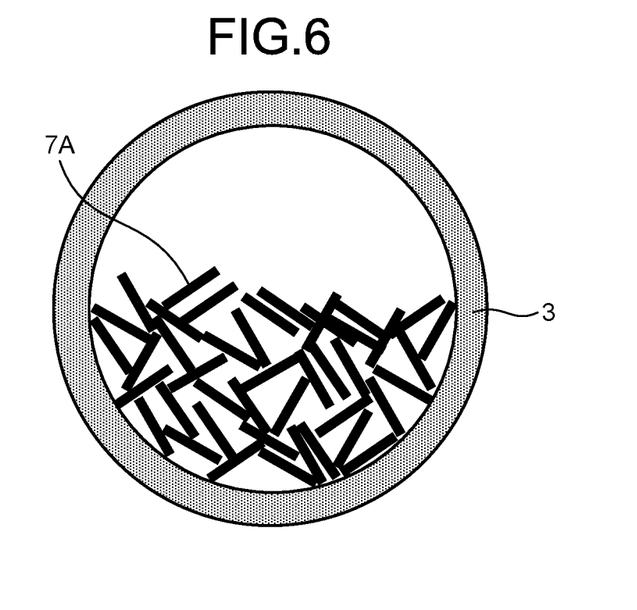
FIG. 6 shows a schematic diagram for illustrating the manufacturing method of Example 5.

A composite structure was obtained in the same manner as in Example 1 except that 85 pieces of strip-like structure precursor 7A of a length of 300 mm and a width of 10 mm made of Material 1 were prepared as a second member and arranged in the pipe 3 as shown in FIG. 6. Physical properties, conditions and the like are shown in Table 1.

Example 6

One obtained by performing up to the shaping step in the same manner as in Example 3 was arranged in a mold having a convex shape on one side, pressurized, and subjected to the molding step. The cooling step was performed while maintaining the pressure to obtain a composite structure. Physical properties, conditions and the like are shown in Table 2.

Example 7

One obtained by performing up to the shaping step in the same manner as in Example 1 was fixed to a pipe bender, partially bent, and subjected to the deformation step. Thereafter, cooling was performed to obtain a composite structure. Physical properties, conditions and the like are shown in Table 2.

Example 8

A longitudinal center of the composite structure obtained in Example 1 was warmed with a heat gun until the surface temperature reached 230° C., and heating was continued for 5 minutes. Thereafter, the composite structure was fixed to a pipe bender, partially bent, and subjected to the deformation step in the same manner as in Example 7. Thereafter, cooling was performed to obtain a composite structure. Physical properties, conditions and the like are shown in Table 2.

Example 9

The composite structure obtained in Example 1 was inserted into a mold, and Material 3 was injection-molded so as to cover one end of the composite structure to obtain an integrated composite structure. Physical properties, conditions and the like are shown in Table 2.

Comparative Example 1

Molding was performed in the same manner as in Example 1 except that a press molding machine attached with a mold having a circular section was used without using the aluminum alloy pipe as the first member. When the mold of the pressing machine was opened in order to shift from the shaping step to the cooling step, the second member was in close contact with the mold and stretched, and the target shape could not be obtained. Physical properties, conditions and the like are shown in Table 3.

Comparative Example 2

Molding was performed in the same manner as in Example 1 except that a pipe made of a polypropylene resin used in Material 1 was used as the first member. The target shape could not be obtained as in Comparative Example 1. Physical properties, conditions and the like are shown in Table 3.

Comparative Example 3

Molding was performed in the same manner as in Example 1 except that the temperature of the drier was set to 150° C. Since the storage elastic modulus of the structure precursor was high, expansion in the shaping step was not sufficient and the close contact did not occur. Physical properties, conditions and the like are shown in Table 3.

TABLE 1

|  |  |  | Example 1 | Example 2 | Example 3 | Example 4 | Example 5 |
|---|---|---|---|---|---|---|---|
| First member |  |  |  |  |  |  |  |
| Material |  | — | Metal | CFRP | Metal | CFRP | Metal |
| Shape |  | — | Cylinder | Cylinder | Box | Box | Cylinder |
| Linear expansion coefficient |  | $1 \times 10^{-6}/°$ C. | 23.6 | 0.3 | 23.6 | 0.3 | 23.6 |
| Bending modulus at temperature in heating process |  | MPa | 60000 | 15000 | 60000 | 15000 | 60000 |
| Thickness |  | mm | 3 | 3 | 2 | 2 | 3 |
| Second member (Structure precursor) |  |  |  |  |  |  |  |
| Material |  | — | Material 1 | Material 1 | Material 1 | Material 1 | Material 1 |
| Volume content | Resin | % | 80 | 80 | 80 | 80 | 80 |
|  | Reinforced fibers | % | 20 | 20 | 20 | 20 | 20 |
|  | Voids | % | 0 | 0 | 0 | 0 | 0 |
| Thickness |  | mm | 0.28 | 0.28 | 0.28 | 0.28 | 0.28 |
| Storage elastic modulus: G' at temperature in heating process |  | $1 \times 10^8$ Pa | 0.015 | 0.015 | 0.015 | 0.015 | 0.015 |
| Second member (Structure material) |  |  |  |  |  |  |  |
| Volume content | Resin | % | 26.6 | 26.6 | 20.0 | 32.0 | 26.6 |
|  | Reinforced fibers | % | 6.7 | 6.7 | 5.0 | 8.0 | 6.7 |
|  | Voids | % | 66.7 | 66.7 | 75.0 | 60.0 | 66.7 |
| Fiber state |  | — | Nearly monofilament | Nearly monofilament | Nearly monofilament | Nearly monofilament | Nearly monofilament |
| Dispersion state |  | — | Random | Random | Random | Random | Random |
| Manufacturing process: |  |  |  |  |  |  |  |
| Arrangement process | Temperature | ° C. | 23 | 23 | 23 | 23 | 23 |
|  | Filling | % | 33 | 33 | 25 | 40 | 33 |
| Heating process | Temperature | ° C. | 230 | 230 | 230 | 230 | 230 |
|  | Time | Min | 10 | 10 | 10 | 10 | 10 |
| Shaping process | Temperature | ° C. | 230 | 230 | 230 | 230 | 230 |
|  | Time | Min | 1 | 1 | 2 | 0.5 | 1 |
| Cooling process | Temperature | ° C. | 23 | 23 | 23 | 23 | 23 |
|  | Time | Min | 30 | 30 | 30 | 30 | 30 |
| Additional process |  | — | — | — | — | — | — |
| Structure Material |  |  |  |  |  |  |  |
| Density |  | g/cm³ | 0.36 | 0.36 | 0.27 | 0.43 | 0.36 |
| Specific bending stiffness |  | — | 5.0 | 5.0 | 5.7 | 4.4 | 5.0 |

TABLE 2

|  |  | | Example 6 | Example 7 | Example 8 | Example 9 |
|---|---|---|---|---|---|---|
| First member | | | | | | |
| Material | | — | Metal | Metal | Metal | Metal |
| Shape | | — | Box | Cylinder | Cylinder | Cylinder |
| Linear expansion coefficient | | $1 \times 10^{-6}$/° C. | 23.6 | 23.6 | 23.6 | 23.6 |
| Bending modulus at temperature in heating process | | MPa | 60000 | 60000 | 60000 | 60000 |
| Thickness | | mm | 2 | 3 | 3 | 3 |
| Second member (Structure precursor) | | | | | | |
| Material | | — | Material 1 | Material 1 | Material 1 | Material 1 |
| Volume content | Resin | % | 80 | 80 | 80 | 80 |
|  | Reinforced fibers | % | 20 | 20 | 20 | 20 |
|  | Voids | % | 0 | 0 | 0 | 0 |
| Thickness | | mm | 0.28 | 0.28 | 0.28 | 0.28 |
| Storage elastic modulus: G' at temperature in heating process | | $1 \times 10^8$ Pa | 0.015 | 0.015 | 0.015 | 0.015 |
| Second member (Structure material) | | | | | | |
| Volume content | Resin | % | 20.0 | 26.6 | 26.6 | 26.6 |
|  | Reinforced fibers | % | 5.0 | 6.7 | 6.7 | 6.7 |
|  | Voids | % | 75.0 | 66.7 | 66.7 | 66.7 |
| Fiber state | | — | Nearly monofilament | Nearly monofilament | Nearly monofilament | Nearly monofilament |
| Dispersion state | | — | Random | Random | Random | Random |
| Manufacturing process: | | | | | | |
| Arrangement process | Temperature | ° C. | 23 | 23 | 23 | 23 |
|  | Filling | % | 25 | 33 | 33 | 33 |
| Heating process | Temperature | ° C. | 230 | 230 | 230 | 230 |
|  | Time | Min | 10 | 10 | 10 | 10 |
| Shaping process | Temperature | ° C. | 230 | 230 | 230 | 230 |
|  | Time | Min | 2 | 1 | 1 | 1 |
| Cooling process | Temperature | ° C. | 23 | 23 | 23 | 23 |
|  | Time | Min | 30 | 30 | 30 | 30 |
| Additional process | | — | Molding process | Deformation process | Deformation process | Injection molding |
| Structure Material | | | | | | |
| Density | | g/cm$^3$ | 0.27 | 0.36 | 0.36 | 0.36 |
| Specific bending stiffness | | — | 5.7 | 5.0 | 5.0 | 5.0 |

TABLE 3

|  |  | | Comparative example 1 | Comparative example 2 | Comparative example 3 |
|---|---|---|---|---|---|
| First member | | | | | |
| Material | | — | — | PP | Metal |
| Shape | | — | — | Cylinder | Cylinder |
| Linear expansion coefficient | | $1 \times 10^{-6}$/° C. | — | 58 | 23.6 |
| Bending modulus at temperature in heating process | | MPa | — | Molten state (Unmeasurable) | 65000 |
| Thickness | | nm | — | 3 | 3 |
| Second member (Structure precursor) | | | | | |
| Material | | — | Material 1 | Material 1 | Material 1 |
| Volume content | Resin | % | 80 | 80 | 80 |
|  | Reinforced fibers | % | 20 | 20 | 20 |
|  | Voids | % | 0 | 0 | 0 |

TABLE 3-continued

|  |  |  | Comparative example 1 | Comparative example 2 | Comparative example 3 |
|---|---|---|---|---|---|
|  | Thickness | mm | 0.28 | 0.28 | 0.28 |
|  | Storage elastic modulus: G' at temperature in heating process | $1 \times 10^8$ Pa | 0.015 | 0.015 | 15.6 |
|  | Second member (Structure material) |  |  |  |  |
| Volume content | Resin | % | 26.6 | 26.6 | 72.7 |
|  | Reinforced fibers | % | 6.7 | 6.7 | 18.0 |
|  | Voids | % | 66.7 | 66.7 | 9.3 |
|  | Fiber state | — | Nearly monofilament | Nearly monofilament | Nearly monofilament |
|  | Dispersion state | — | Random | Random | Random |
|  | Manufacturing process: |  |  |  |  |
| Arrangement process | Temperature | °C. | 23 | 23 | 23 |
|  | Filling | % | 33 | 33 | 33 |
| Heating process | Temperature | °C. | 230 | 230 | 150 |
|  | Time | Min | 10 | 10 | 10 |
| Shaping process | Temperature | °C. | 230 | 230 | 150 |
|  | Time | Min | 1 | 1 | 1 |
| Cooling process | Temperature | °C. | 23 | 23 | 23 |
|  | Time | Min | — | — | — |
|  | Additional process | — | — | — | — |
|  | Structure Material |  |  |  |  |
|  | Density | g/cm³ | — | — | 0.98 |
|  | Specific bending stiffness | — | — | — | 2.3 |

In Examples 1 to 5 described above, various shapes were easily formed, and composite structures excellent in lightness and mechanical properties could be obtained. In addition, since auxiliary materials and a press molding machine were not used, the composite structures could be obtained without requiring much cost. Moreover, in Examples 1, 2 and 5, since the cylindrical pipe was used, cooling of the cooling step did not have to occupy the apparatus (mold), thus the molding cycle could be shortened. Also, in Example 6, when the section of the obtained composite structure was confirmed, a more complicated shape could be obtained in a state in which the second member was in close contact with the molded first member. In Example 7, a composite structure in which the second member was in close contact with the first member could be obtained as in Example 6. Further, in Example 8, it was possible to partially heat a portion to be deformed, and deform as in Example 7. This indicates that even in the position where such a composite structure is assembled, size and shape correction can be easily performed to perform assembly. In Example 9, since the obtained integrated composite structure can be, for example, a pipe having a grip (handle portion), it can be used as a frame of a wheelchair or a moving vehicle body.

On the other hand, in Comparative Example 1, the second member was deformed when shifting to the cooling step, and the intended structure material could not be obtained. In such a case, since it takes time until the second member is completely solidified in the cooling step, the molding cycle becomes long. In addition, apparatuses such as a pressing machine and a mold are required, which is costly. In Comparative Example 2, the bending modulus in the heating step of the first member was too low, and therefore, it was deformed when shifting to the cooling step, and the intended composite structure could not be obtained. Also in such a case, the molding cycle is prolonged as in Comparative Example 1. In Comparative Example 3, a composite structure in which the expansion of the second member was not sufficient and the close contact with the first member was insufficient was obtained.

INDUSTRIAL APPLICABILITY

According to the present invention, it is possible to provide a composite structure having a complicated shape and excellent in lightness and mechanical properties without requiring much cost.

DESCRIPTION OF REFERENCE SIGNS

1a to 1f: Single filament
2: Composite structure
3: Pipe (First member)
4: Resin
5: Reinforced fiber
6: Void
7: Structure precursor
8: Core (Second member)

The invention claimed is:

1. A method for manufacturing a composite structure in which a first member and a structure material as a second member are integrated, the method comprising:
   an arrangement step of arranging a structure precursor comprising a resin and reinforced fibers in a mold comprising the first member;
   a heating step of heating the structure precursor to equal to or higher than a temperature at which a storage elastic modulus (G') of the structure precursor is less than $1.2 \times 10^8$ Pa;
   a shaping step of expanding the structure precursor during the heating step to form a structure material as a second member, and bringing the structure material into close contact with the first member to obtain a composite structure; and a cooling step of cooling the composite structure, the first member having a bending modulus of 5 GPa or more at a temperature of the heating step, the structure material as the second member comprising a resin, reinforced fibers and voids.

2. The method for manufacturing a composite structure according to claim 1, which further comprises a molding step of molding the composite structure by pressurization, after the shaping step.

3. The method for manufacturing a composite structure according to claim 1, which further comprises a deformation step of locally applying pressure to deform the composite structure, after the shaping step.

4. The method for manufacturing a composite structure according to claim 3, wherein at least a part of a portion to be deformed is heated in the deformation step.

5. The method for manufacturing a composite structure according to claim 1, wherein a linear expansion coefficient of the first member is $50 \times 10^{-6}/°$ C. or less.

6. The method for manufacturing a composite structure according to claim 1, wherein the first member is a member selected from the group consisting of a fiber reinforced thermosetting resin member, a fiber reinforced thermoplastic resin member, a metal member, and a ceramic member.

7. The method for manufacturing a composite structure according to claim 1, wherein a thickness of the first member is 0.1 mm or more.

8. The method for manufacturing a composite structure according to claim 1, wherein the structure material as the second member satisfies the following (1) to (3):

(1) a volume content of the resin is 2.5 to 85% by volume;

(2) a volume content of the reinforced fibers is 0.5 to 55% by volume; and (3) a volume content of the voids is 10 to 97% by volume.

9. The method for manufacturing a composite structure according to claim 1, wherein the structure precursor satisfies the following (4) to (6):

(4) a volume content of the resin is 2.5 to 95% by volume;

(5) a volume content of the reinforced fibers is 0.5 to 85% by volume; and (6) a volume content of the voids is 0 to 30% by volume.

10. The method for manufacturing a composite structure according to claim 1, wherein a density ($\rho$) of the structure material as the second member is 0.9 g/cm$^3$ or less.

11. The method for manufacturing a composite structure according to claim 1, wherein the reinforced fibers in the structure material as the second member are discontinuous, and dispersed in a nearly monofilament form and in a random manner.

12. A method for manufacturing an integrated composite structure, the method comprising further integrating another member with at least a part of a surface of the composite structure obtained by the method according to claim 1.

* * * * *